United States Patent [19]

Kato et al.

[11] 4,262,738

[45] Apr. 21, 1981

[54] AIR CONDITIONING APPARATUS FOR VEHICLE

[75] Inventors: Nobuhiro Kato, Saitama; Masami Ohtani, Higashimatsuyama, both of Japan

[73] Assignee: Diesel Kiki Co., Ltd., Tokyo, Japan

[21] Appl. No.: 19,637

[22] Filed: Mar. 12, 1979

[30] Foreign Application Priority Data

Mar. 18, 1978 [JP] Japan .................... 53-31427
Mar. 18, 1978 [JP] Japan .................... 53-31428

[51] Int. Cl.³ .................................. F25B 29/00
[52] U.S. Cl. ............................. 165/25; 165/43; 236/84
[58] Field of Search .................. 91/6; 165/25, 43; 236/84

[56] References Cited

U.S. PATENT DOCUMENTS

| | | | |
|---|---|---|---|
| 2,719,535 | 10/1955 | Anderson | 137/DIG. 1 |
| 2,966,032 | 12/1960 | Weymouth, Jr. | 91/6 |
| 3,061,453 | 1/1975 | Grier et al. | 137/DIG. 1 |
| 3,263,739 | 8/1966 | Gaskill et al. | 165/23 |
| 3,434,388 | 3/1969 | Julow et al. | 91/6 |
| 3,707,980 | 1/1973 | Bergamini | 137/DIG. 1 |
| 4,153,068 | 5/1979 | Yoshida | 137/DIG. 1 |

Primary Examiner—William E. Tapolcai, Jr.
Attorney, Agent, or Firm—David G. Alexander

[57] ABSTRACT

A plurality of movable dampers (23), (26), (31) are provided in an air flow duct (12) to control the temperature and air flow therethrough. A heater core (19) and/or air conditioner evaporator (18) are disposed in the duct (12). The dampers (23), (26), (31) are positioned by vacuum actuators (28), (29), (33) in accordance with applied vacuum. Sensors (47), (48), (49) sense the temperature in the duct (12), an automobile passenger compartment into which the duct (12) leads and the like. A control means unit (44) modulates vacuum from a source (34) in accordance with sensed temperature so as to maintain the temperature at a desired value. In case of failure of the automatic control unit (44), a manual valve unit (51), (53), (56) may be operated to connect the actuators (28), (29), (31) either to the vacuum source (34) or to the atmosphere so as to position the dampers (23), (26), (31) minimum or maximum temperature operation respectively.

4 Claims, 6 Drawing Figures

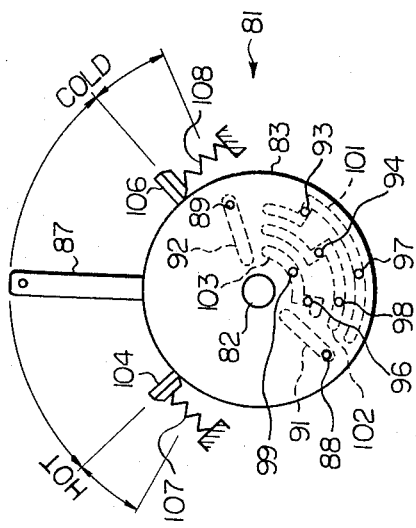
Fig. 5
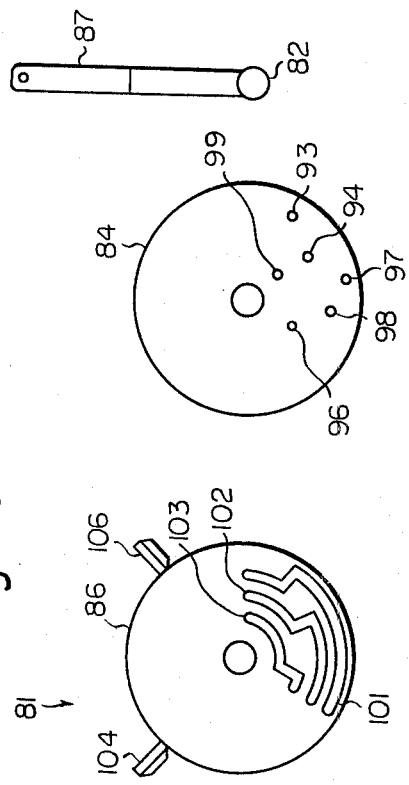
Fig. 6
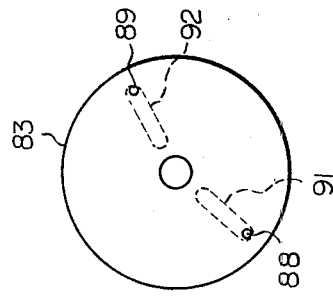

AIR CONDITIONING APPARATUS FOR VEHICLE

BACKGROUND OF THE INVENTION

The present invention relates to an air conditioning apparatus for an automotive vehicle. An apparatus of the present type is disclosed in U.S. Pat. No. 3,263,739 which constitutes the closest known prior art.

Generally, the apparatus comprises a duct in which is provided a heater core and an air conditioner evaporator. The outlet of the duct leads into a passenger compartment of the vehicle. The inlet of the duct may be connected to the atmosphere or to the passenger compartment for recirculation. Movable dampers are provided in the duct to control the temperature and connect the inlet and outlet of the duct is required by the mode of operation.

The temperature in the passenger compartment, duct and the like is sensed and the dampers positioned to automatically maintain the temperature at a desired value. This is accomplished by modulating vacuum from a suitable source and applying the modulated vacuum to vacuum motors or actuators which position the dampers in accordance with the level of vacuum.

Although the basic apparatus is generally satisfactory and advantageous, the system is prone to failure of a sensor, control unit or the like. Under such conditions, the hot air may be blown into the passenger compartment in the summer and cold air blown into the passenger compartment in the winter through the duct. This makes the temperature in the passenger compartment extremely uncomfortable and interferes with the driver's ability to safely operate the vehicle. Although the apparatus may be shut off, this results no air conditioning whatsoever and the temperature in the passenger compartment will approach the temperature of the atmosphere. This results in only a smaller degree of discomfort.

SUMMARY OF THE INVENTION

In accordance with the present invention, a plurality of movable dampers are provided in an air flow duct to control the temperature and flow therethrough. A heater core and/or air conditioner evaporator are disposed in the duct. The dampers are positioned by vacuum actuators in accordance with applied vacuum. Sensors sense the temperature in the duct, an automobile passenger compartment into which the duct leads and the like. A control unit modulates vacuum from a source in accordance with sensed temperature so as to maintain the temperature at a desired value. In case of failure of the automatic control unit, a manual value unit may be controlled to connect the actuators either to the vacuum source or to the atmosphere so as to position the dampers for minimum or maximum temperature operation respectively.

In this manner, in case of a failure of the automatic temperature control apparatus in the summer, the operator changes the valve over to the minimum temperature position in which the air in the passenger compartment is cooled by means of the evaporator in the duct. Although the temperature may be cooler than desired, it is less uncomfortable than no air conditioning at all. If the system fails in the winter, the operator changes the valve over to the maximum temperature position in which the air in the passenger compartment is heated to a maximum extent by the heater core in the duct.

It is an object of the present invention to provide an improved air conditioning apparatus for an automotive vehicle or the like comprising means for manually operating the apparatus in the maximum heating mode or cooling mode in the event of a failure of an automatic control system.

It is another object of the present invention to provide an improved air conditioning apparatus which is operable in the event of an automatic control failure.

It is another object of the present invention to provide a generally improved air conditioning apparatus for a motor vehicle or the like.

Other objects, together with the following, are attained in the embodiments described in the following description and shown in the accompanying drawing.

BRIEF DESCRIPTION OF THE DRAWING

FIG. 5 is a plan view of another manual control valve embodying the present invention; and FIG. 6 is a disassembled view of the valve of FIG. 5.

DESCRIPTION OF THE PREFERRED EMBODIMENTS

While the air conditioning apparatus of the invention is susceptible of numerous physical embodiments, depending upon the environment and requirements of use, substantial numbers of the herein shown and described embodiments have been made, tested and used, and all have performed in an eminently satisfactory manner.

Figure 1:
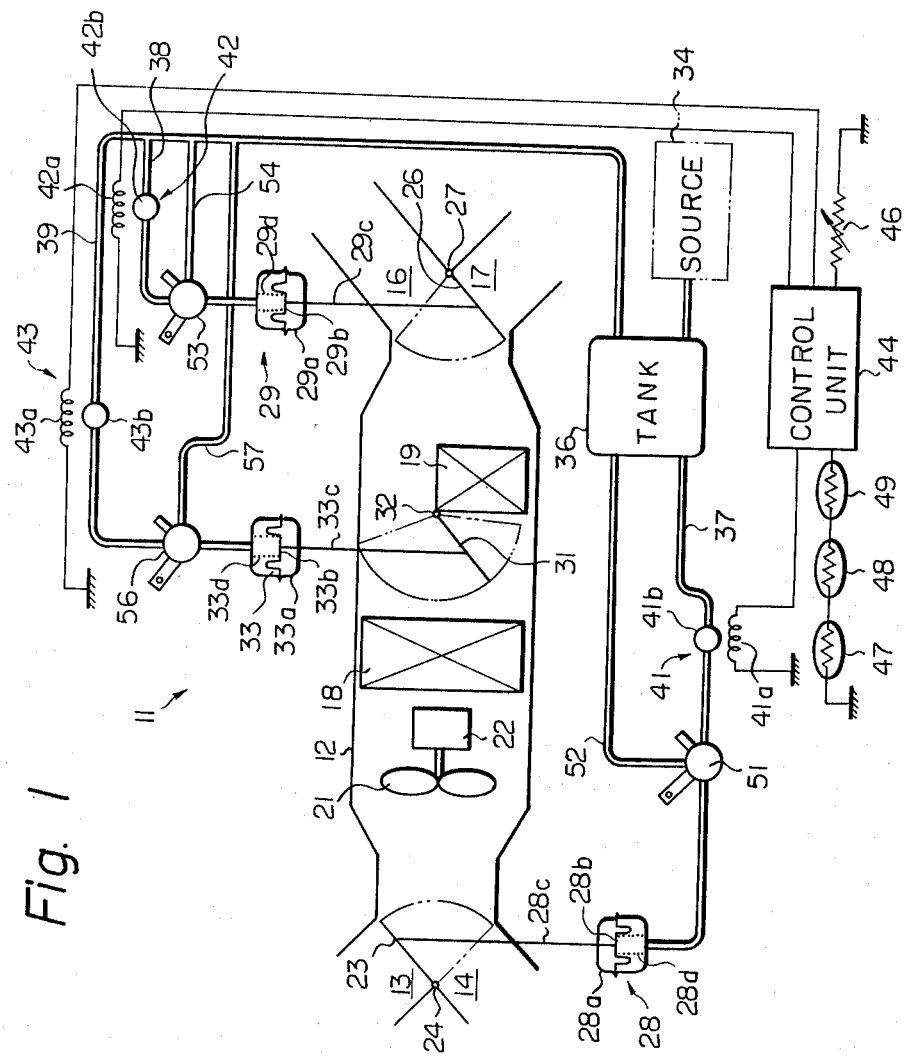
FIG. 1 is a schematic diagram of an air conditioning apparatus embodying the present invention.

Referring now to FIG. 1 of the drawing, an air conditioning apparatus embodying the present invention is generally designated by the reference numeral 11 and comprises a duct 12. The duct 12 is provided in an automotive vehicle (not shown) and has an inlet 13 which leads to the atmosphere outside the vehicle. Another inlet 14 leads into the duct 12 from the passenger compartment, or from inside the vehicle.

The duct 12 further has a cold air outlet 16 and a hot air outlet 17 which each lead into the passenger compartment.

Mounted inside the duct 12 is an air conditioner evaporator 18 for cooling the air in the duct 12 and a heater core 19 for heating the air in the duct 12. A fan 21 is driven by a motor 22 to circulate air through the duct 12.

A control door or damper 23 is pivotally mounted at the junction of the inlets 13 and 14 and duct 12 by means of a shaft 24 to control air flow into the duct 12. A similar control door or damper 26 is pivotally mounted at the junction of the duct 12 and outlets 16 and 17 by means of a shaft 27 to control air flow out of the duct 12.

The damper 23 is pivotally positioned by means of a vacuum motor or actuator 28. The actuator 28 comprises a housing 28a in which is provided a diaphragm 28b. The diaphragm 28b is connected to the damper 23 by means of a rod 28c. A compression spring 28d urges the diaphragm 28b and rod 28c upwardly as viewed in FIG. 1 to move the damper 23 to the upper solid line position. In this position the inlet 13 is blocked and the inlet 14 is opened.

Application of vacuum to the lower surface of the diaphragm 28b causes the same to move downwardly against the force of the spring 28d and swing the damper 23 to a phantom line position in which the inlet 13 is opened and the inlet 14 is blocked. The actuator 28 is actuated by fluid pressure, in this case vacuum, to position the damper 23 at the solid line position, the phantom line position or any position therebetween in accordance with the level of applied vacuum.

The damper 26 is controlled by an actuator 29 in the same manner the damper 23 is controlled by the actuator 28. The actuator 29 is identical to the actuator 28 and the individual components are designated by the same lower case letters suffixed to the reference numeral 29. When no vacuum (atmospheric pressure) is applied to the actuator 29, it moves the damper 26 to the solid line position to open the outlet 16 and bolck the outlet 17. When full vacuum is applied to the actuator 29 the damper 26 blocks the outlet 16 and opens the outlet 17.

Another damper 31 is pivotally mounted about a shaft 32 upstream of the heater core 19. The damper 31 is positioned by an actuator 33 which is identical to the actuators 28 and 29. With atmospheric pressure applied to the actuator 33, the damper 31 is moved to a lower phantom line position to block the heater core 19 and cause all air passing through the duct 12 to bypass the heater core 19. With full vacuum applied to the actuator 33 the damper 31 is moved to an upper phantom line position to unblock the heater core 19. In this position all air flowing through the duct 12 is forced to pass through the heater core 19.

With an intermediate level of vacuum applied to the actuator 33, the damper 31 is moved to an exemplary solid line position in which some of the air flowing through the duct 12 passes through the heater core 19 and the remaining portion of the air bypasses the heater core 19 and passes thereabove.

Further illustrated is a source of vacuum such as the intake manifold of the automotive vehicle which is designated as 34. The source 34 is connected to a vacuum tank or accumulator 36 which is maintained at a generally constant level of vacuum due to its size and is preferably provided with a check valve (not shown) to prevent loss of vacuum in case the engine of the vehicle is shut off.

Vacuum is applied from the tank 36 to the actuators 28, 29 and 33 through conduits 37, 38 and 39 respectively. Vacuum modulators 41, 42 and 43 are provided in the conduits 37, 38 and 39 respectively. Each modulator 41, 42 and 43 comprises an electromagnetic coil designated by the suffixed lower case letter a which is connected to a control unit 44 and an electromagnetic valve designated by the suffixed lower case letter b which is opened or closed to a degree corresponding to the electrical voltage applied to the coil.

A temperature setting means is constituted by a variable resistor 46 connected between the control unit 44 and ground. The slider (not designated) of the resistor 46 is manually positioned by the vehicle operator to set a desired temperature into the control unit 44.

Further connected in series between the control unit 44 and ground are three thermistors 47, 48 and 49 which function as temperature sensors. The thermistor 47 senses the temperature in the atmosphere outside the vehicle. The thermistor 48 senses the temperature inside the passenger compartment. The thermistor 49 senses the temperature at the outlet of the duct 12 upstream of the damper 26. The electrical resistance of the thermistors 47, 48 and 49 varies in inverse proportion to temperature. The total resistance of the thermistors 47, 48 and 49 in series is used by the control unit 44 as a measure of sensed temperature.

In operation, the control unit 44 applies electrical voltages to the modulators 41, 42 and 43 in accordance with the temperature setting from the resistor 46 and the sensed temperature from the thermistors 47, 48 and 49. Where the apparatus 11 is desired to cool the air in the passenger compartment, the control unit 44 will apply a voltage to the modulator 41 to modulate the vacuum applied to the actuator 28 to a low level. This will cause the damper 23 to block the inlet 13 and open the inlet 14 to recirculate cooled air through the duct 12 and passenger compartment. Air may be introduced from the outside if required by controlling the modulator 41 to apply a high level of vacuum to the actuator 28.

For cooling, the control unit 44 applies a signal to the modulator 42 to apply a low level of vacuum to the actuator 29 and move the damper 26 to direct all air through the cold air duct 16. In addition, the control unit 44 applied a signal to the modulator 43 to move the damper 31 to the lower position and direct air to bypass the heater core 19.

For heating, the damper 23 is moved to direct air through the outside air inlet 13 into the duct 12. The damper 26 is moved to direct all air through the hot air outlet 17. The damper 31 is moved to direct air through the heater core 19.

Depending on the desired and sensed temperatures, the control unit 44 automatically positions the damper 31 to direct a varying proportion of air through the heater core 19. To increase the temperature the damper 31 is moved to direct more air through the heater core 19 and vice-versa.

In accordance with the present invention, a valve 51 is provided to selectively connect the actuator 28 to the atmosphere, to the tank 36 through a bypass conduit 52 or to the modulator 41 through the conduit 37. A valve 53 is provided to selectively connect the actuator 29 to the atmosphere, to the tank 36 through a bypass conduit 54 or to the modulator 42 through the conduit 38. A valve 56 is provided to selectively connect the actuator 33 to the atmosphere, to the tank 36 through a bypass conduit 57 or to the modulator 43 through the conduit 39. The valves 51, 53 and 56 may be integral or may be manufactured separately and linked together for integral operation.

During normal automatic temperature control operation, the valves 51, 53 and 56 are manually set by the operator to connect the actuators 28, 29 and 33 to the modulators 41, 42 and 43 respectively to operate as described hereinabove. However, in case of a failure of the automatic control system resulting in erroneous temperature control, the operator may change over the valves 51, 53 and 56 to control the apparatus 11 to operate in either a minimum of maximum temperature mode.

For operation in the summer it is desired to switch the apparatus 11 to the full cooling mode. This is done by changing over the valves 51, 53 and 56 so as to connect the actuators 28, 29 and 33 to the atmosphere. As a result, the damper 23 is moved to the solid line position to direct all air through the inlet 14 for recirculation through the passenger compartment. The damper 26 is moved to the solid line position to direct all air through the cold air outlet 16. The damper 31 is moved to the lower phantom line position to block the heater core 19 and direct all air to bypass the heater core 19. Although the temperature in the passenger compartment may become cooler than desired, it will be more comfortable than the extreme heat which would occur if the apparatus 11 were merely turned off.

For operation in the winter the operator changes the valves 51, 53 and 56 so as to connect the actuators 28, 29 and 33 to the tank 36. This has the effect of applying full vacuum to the actuators 28, 29 and 33. As a result, the damper 23 is moved to the phantom line position to admit outside air into the duct 12. The damper 26 is moved to the phantom line position to direct all air from the duct 12 through the hot air outlet 17. The damper 31 is moved to the upper phantom line position to direct all air through the heater core 19. Although the temperature may become warmer than desired, it will be preferable to the extreme cold which would result if the apparatus 11 were shut down.

Figure 4:
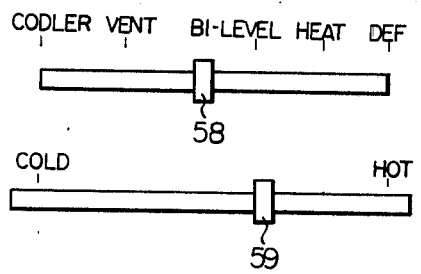
FIG. 4 is a schematic view of a temperature setting means of the present apparatus.

FIG. 4 illustrates a mode control lever 58 for setting the heating or cooling mode and a temperature setting lever 59 for setting the desired temperature. The lever 59 is ganged to the slider of the variable resistor 46 and to the valves 51, 53 and 56. When the lever 59 is moved in a range between cold and hot settings, the apparatus 11 will be operated in the automatic temperature control mode. If the lever 59 is moved to a minimum temperature position leftwardly of the cold setting, the valves 51, 53 and 56 will change the mode to full cooling as described above. Similarly, if the lever 59 is moved to a maximum temperature position rightwardly of the hot setting, the apparatus 11 will operate in the full heating mode.

Figure 2:
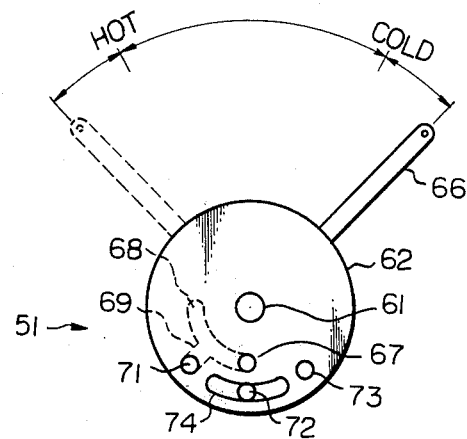
FIG. 2 is a plan view of a manual control valve of the present apparatus.
Figure 3:
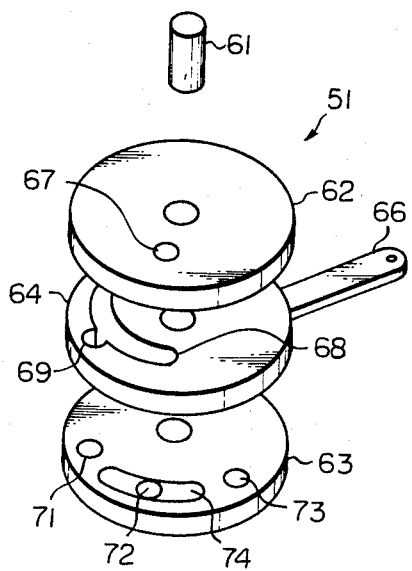
FIG. 3 is an exploded view of the valve of FIG. 2.

A first embodiment of the valve 51 is illustrated in FIGS. 2 and 3. It will be recalled that the valves 53 and 56 are identical to the valve 51 and for this reason are not illustrated repetitiously.

The valve 51 comprises a hub 61 on which is rigidly fitted an upper disc 62 and a lower disc 63. An inner disc 64 which constitutes a valve element is rotatably mounted on the hub 61 between the discs 62 and 63 in a sealing manner. An actuator lever 66 is fixed to the disc 64 by means of which the disc 64 is rotated by the lever 59 through a linkage (not shown).

The disc 62 is formed with a through hole 67 which is connected to the actuator 28. The hole 67 communicates with an annular slot 68 formed through the disc 64. A hole 69 is formed through the disc 64 and communicates with the slot 68.

The disc 63 is formed with three through holes 71, 72 and 73 which are radially spaced from the hub 61 by the same distance as the hole 69. An annular groove 74 formed in the upper surface of the disc 63 communicates with the hole 72. The hole 71 is connected to the atmosphere. The hole 72 is connected to the modulator 41 through the conduit 37. The hole 73 is connected to the tank 36 through the bypass conduit 52.

When the lever 66 is moved to its most clockwise position past the cold position, as illustrated in solid line in FIG. 2, the actuator 28 is connected to the atmosphere through the hole 67, slot 68, hole 69 and hole 71. When the lever 66 is in its most counterclockwise position past the hot position as illustrated in phantom line, the actuator 28 is connected to the tank 36 through the hole 67, slot 68, hole 69 and hole 73. When the lever 66 is intermediate between the cold and hot positions the actuator 28 is connected to the modulator 41 through the hole 67, slot 68, hole 69, groove 74 and hole 72. It will be noted that the slot 68 may be replaced by a groove formed in the upper surface of the disc 64 since its function is to connect the hole 67 to the hole 69 at all positions of the disc 64. The purpose of the groove 74 is to connect the hole 69 to the hole 72 at all positions of the disc 64 between the cold and hot positions.

Another embodiment of the valves 51, 53 and 56 is illustrated in FIGS. 5 and 6. In this case, the functions of the valves 51, 53 and 56 are provided by a single valve 81.

The valve 81 comprises a hub 82 about which an upper disc 83 and a lower disc 84 are fixedly mounted. An intermediate disc 86 is rotatably mounted on the hub 82 between the discs 83 and 84. An operating lever 87 is also mounted for rotation about the hub 82. In this case the hub 82 is integral with the lever 87. The lever 87 is connected to the lever 59 through a linkage (not shown).

The disc 83 is formed with a hole 88 communicating with the atmosphere and a hole 89 communicating with the tank 36. The disc 83 is also formed with radial grooves 91 and 92 on its lower surface which communicate with the holes 88 and 89 respectively.

The disc 84 is formed with holes 93, 94 and 96 which communicate with the modulators 41, 42 and 43 respectively. The disc 84 is also formed with holes 97, 98 and 99 which communicate with the actuators 28, 29 and 33 respectively.

The disc 86 is formed with slots 101, 102 and 103 therethrough which are shaped as illustrated. Arms 104 and 106 are fixed to the periphery of the disc 86. Compression springs 107 and 108 engage with the arms 104 and 106 respectively to urge the disc 86 to a position in the range between the cold and hot positions.

With the lever 87 in a position between the cold and hot settings the disc 86 is positioned as illustrated. The lever 87 does not engage with either of the arms 104 and 106 and thereby does not engage with or move the disc 86.

In this position the actuator 28 is connected to the modulator 41 through the hole 97, groove 101 and hole 93. The actuator 29 is connected to the modulator 42 through the hole 98, groove 102 and hole 94. The actuator 33 is connected to the modulator 43 through the hole 99, groove 103 and hole 96.

If the lever 87 is moved clockwise past the cold position it will engage with and move the arm 106 and disc 86 clockwise against the force of the spring 108. In this case, the actuator 28 will be connected to the atmosphere through the hole 97, groove 101, groove 91 and hole 88. The actuator 29 will be connected to the atmosphere through the hole 98, groove 102, groove 91 and hole 88. The actuator 33 will be connected to the atmosphere through the hole 99, groove 103, groove 91 and hole 88.

If the lever 87 is moved counterclockwise past the hot position it will engage with and move the arm 104 and disc 86 counterclockwise against the force of the spring 107. The actuator 28 will be connected to the tank 36 through the hole 97, groove 101, groove 92 and hole 89. The actuator 29 will be connected to the tank 36 through the hole 98, groove 102, groove 92 and hole 89. The actuator 33 will be connected to the tank 36 through the hole 99, groove 103, groove 92 and hole 89. It will thus be seen that the function provided by the valve 81 is the same as that provided by the individual valves 51, 53 and 56.

In summary, it will be seen that the present invention overcomes the drawbacks of the prior art and provides an air conditioning apparatus for an automotive vehicle which can be operated in the event of failure of an automatic control system. Various modifications will become possible for those skilled in the art after receiving the teachings of the present disclosure without departing from the scope thereof. For example, the actuators 28, 29 and 33 may be replaced with actuators which operate on positive fluid pressure rather than vacuum. Also, the apparatus may be expanded to include and operate a defroster damper in the manner described with respect to the other dampers.

What is claimed is:

1. An air conditioning apparatus having an air flow duct, a movable damper for controlling air flow through the duct, a heater core for heating the air in the duct, an evaporator for cooling the air in the duct, an actuator for positioning the damper in accordance with fluid pressure applied to the actuator, a fluid pressure source and a fluid pressure modulator for modulating fluid pressure from the source, the combination therewith comprising valve means for selectively connecting the actuator to the modulator, the source or the atmosphere;

sensor means for sensing a temperature inside the passenger compartment, the modulator modulating the fluid pressure in accordance with an output of the sensor means;

control means connected to the sensor means and temperature setting means for setting a desired temperature into the control means, the control means controlling the modulator to modulate the fluid pressure in such a manner that the temperature inside the passenger compartment equals the desired temperature;

the valve means being controlled by the temperature setting means;

the temperature setting means comprising a movable member which is movable from a minimum temperature setting through an automatic temperature control range to a maximum temperature setting, the valve means being controlled by the movable member to connect the actuator to one of the source or the atmosphere when the movable member is at the minimum temperature setting, to the modulator when the movable member is in the automatic temperature control range and to the other of the source or the atmosphere when the movable member is at the maximum temperature setting.

2. An apparatus as in claim 1, in which the valve comprises a movable element and first and second arms fixed to the element, the movable member engaging the first and second arms and thereby moving the element when moved from the automatic temperature control range to the minimum and maximum temperature settings respectively.

3. An apparatus as in claim 2, further comprising spring means for urging the element to a position to connect the actuator to the modulator.

4. An apparatus as in claim 1, in which the source comprises a vacuum source, the fluid pressure being vacuum.

* * * * *